United States Patent [19]

Johnson

[11] Patent Number: 4,631,157

[45] Date of Patent: Dec. 23, 1986

[54] PRODUCTION OF PERMEABLE CELLULOSE TRIACETATE MEMBRANES

[75] Inventor: Bruce M. Johnson, Bend, Oreg.

[73] Assignee: Bend Research, Inc., Bend, Oreg.

[21] Appl. No.: 776,522

[22] Filed: Sep. 16, 1985

[51] Int. Cl.$^4$ .................. B29C 67/20; B29K 1/00
[52] U.S. Cl. ..................... 264/41; 264/187; 264/218
[58] Field of Search ............... 264/217, 218, 41, 187

[56] References Cited

U.S. PATENT DOCUMENTS

| | | | |
|---|---|---|---|
| 2,236,648 | 4/1941 | Nagel et al. | 264/218 |
| 3,883,626 | 5/1975 | Kamide et al. | 264/41 |
| 3,917,777 | 11/1975 | Arada et al. | 264/218 |
| 4,026,978 | 5/1977 | Mungle et al. | 264/217 |
| 4,279,846 | 7/1981 | Ishii et al. | 264/217 |
| 4,496,456 | 1/1985 | Hafez et al. | 264/187 |
| 4,541,972 | 9/1985 | Wernick | 264/41 |

FOREIGN PATENT DOCUMENTS

| | | | |
|---|---|---|---|
| 317408 | 8/1929 | United Kingdom | 264/187 |
| 2013559 | 8/1979 | United Kingdom | 264/217 |

*Primary Examiner*—James Lowe
*Attorney, Agent, or Firm*—Chernoff, Vilhauer, McClung & Stenzel

[57] ABSTRACT

A phase inversion process for the preparation of cellulose triacetate (CTA) and regenerated cellulose membranes is disclosed. Such membranes are useful as supports for liquid membranes in facilitated transport processes, as microfiltration membranes, as dialysis or ultrafiltration membranes, and for the preparation of ion-selective electrodes. The process comprises the steps of preparing a casting solution of CTA in a solvent comprising a mixture of cyclohexanone and methylene chloride, casting a film from the casting solution, and immersing the cast film in a methanol bath. The resulting CTA membrane may then be hydrolyzed to regenerated cellulose using conventional techniques.

6 Claims, No Drawings

PRODUCTION OF PERMEABLE CELLULOSE TRIACETATE MEMBRANES

The government has rights in this invention under Contract No. DE-AC06-79ER10337 granted by the Department of Energy.

This invention relates to the preparation of highly permeable cellulose triacetate and regenerated cellulose membranes.

BACKGROUND OF THE INVENTION

The phase inversion method of making cellulose ester membrane is known, and generally comprises preparing a homogeneous casting solution of the cellulose ester in a solvent or solvent mixture which may include various additives, then casting the solution into a film, followed by immersion in a so-called "non-solvent" precipitant solution at ambient to subambient temperatures to precipitate the membrane. The basic requirements of the non-solvent precipitant solution are that it be a poor solvent for the cellulose ester and it be miscible with the casting solvents. Additives may also be included in the non-solvent solution to modify its solvating power for the cellulose ester and to control its miscibility with the casting solvents. The cellulose ester membrane may then be converted to a highly solvent-resistant regenerated cellulose membrane by hydrolysis with an aqueous solution of a strong base such as sodium hydroxide which contains a highly polar solvent such as dimethylsulfoxide (DMSO).

Cellulose triacetate (CTA) is a desirable membrane material because it forms strong films that are inert toward many solvents. There are few reported methods for the manufacture of CTA membranes. This is undoubtably due to the limited choice of solvents for CTA. Reverse osmosis (RO)-type CTA membranes have been prepared using mixtures of acetone with dioxane or DMSO as the casting solvents. Other components are later added to the solution just prior to casting, and the cast films are then precipitated in a subambient water bath containing still more additives. There is therefore a need in the art for a simple method of preparing CTA membranes without the need for a complex series of additives.

Recently a need has arisen for new porous membranes that can serve as supports for composite immobilized liquid membranes useful in facilitated transport processes such as for the production of oxygen using oxygen carriers in such liquid membranes. See, for example, the review by Way, et al., entitled "Selection of Supports for Immobilized Liquid Membranes" In *Materials Science of Synthetic Membranes*, ACS Symposium Series No. 269, pages 119-128 (1985). The support membrane greatly influences the performance of the resulting facilitated-transport liquid membrane. The support membrane must be chemically inert toward the components in the liquid membrane. The support must also be highly porous and have a pore diameter large enough to allow free diffusion of the carrier, yet not have pores so large that the liquid membrane is not effectively retained within them. Finally, the support membrane should be thin because the flux across a membrane is inversely proportional to its thickness.

There has also been a long-felt need in the dialysis art for suitably strong and highly permeable membranes capable of removing salts and low molecular weight organic compounds.

Further, there has been a need for such membranes for the manufacture of ion-selective electrodes used in analytical applications and as the electrode barrier for selective metal separation electrolytic processes.

These needs and others are met by the process and product of the present invention, which are summarized and described in detail below.

SUMMARY OF THE INVENTION

According to the present invention there is provided a novel process for the production of novel CTA membranes, and novel regenerated cellulose hydrolysis products thereof. The method comprises the steps of (1) preparing a casting solution of CTA in a solvent of cyclohexanone and methylene chloride, (2) casting a film from the CTA solution, and (3) precipitating the membrane by immersion of the cast film in a methanol bath. Alternatively, solvent may be evaporated from the cast film between the second and third steps, producing an asymmetric "skinned" membrane of the type commonly used in ultrafiltration and RO applications. Regenerated cellulose membranes may be obtained by conventional hydrolysis treatment of the CTA membrane comprising first soaking the membrane in a water bath, then in an aqueous solution of alkali metal hydroxide and a polar solvent such as DMSO, N-methylpyrrolidone (NMP), or *gamma*-butyrolactone (BLO).

DETAILED DESCRIPTION OF THE INVENTION

The present invention comprises a simple four-component system that produces opaque to optically transparent CTA membranes (depending on the proportions of components and casting conditions) that are mechanically strong, solvent resistant, porous, and highly permeable. The membranes may be prepared such that they exhibit a range of properties from those found in commerical microfiltration membranes (filtration of 10 to 0.04 micron size particles) to ultrafiltration (filtration of polymer molecules) and RO-type membranes (which filter individual ions).

The novel method of the present invention inherently produces novel CTA and regenerated cellulose membranes exhibiting a range of controllable and useful properties. Highly permeable membranes are produced with a porosity greater than 80%, and a pore diameter as large as 0.1 micron (in the microfiltration range) to much smaller than 0.03 micron (in the ultrafiltration range). Defect-free membranes with thicknesses from 5 microns to greater than 150 microns have been prepared using the present method. Principal utility of such membranes lies in their use as a support for facilitated transport membranes. Other uses include microfiltration, ultrafiltration, reverse osmosis, dialysis, and as the sensor element in ion-selective electrodes.

The casting solution for the membranes of the present invention is prepared by dissolving from 1.25 wt% to 20 wt%, preferably 2 wt% to 10 wt% CTA in a novel solvent mixture comprising cyclohexanone and methylene chloride (MEC) in a ratio of from 4 parts by weight cyclohexanone to 1 part by weight MEC (4:1) to 1 part by weight cyclohexanone to 4 parts by weight MEC (1:4). A preferred ratio is from 3:1 to 1:2 cyclohexanone to MEC.

The so-prepared casting solution may then be cast by conventional techniques into thin films, beads, fibers, and hollow fibers. In the case of films, a spreader knife over a glass plate or other smooth surface such as Teflon ® at ambient temperature and pressure may be used to prepare films on the order of 0.2 to 4 mils in thickness with pore diameters of 0.1 micron and less. Beads may be prepared by the methods described in U.S. Pat. No. 4,515,906. Fibers may be prepared by the methods described in U.S. Pat. Nos. 4,515,906 and 4,045,532. Hollow fibers may be prepared by the methods described in U.S. Pat. No. 4,229,154 and by Baum et al. in *Membrane Separation Processes* (1976).

If a skinned, anisotropic membrane of the type commonly used in ultrafiltration and RO is desired, solvent may be evaporated from one surface of the cast film by exposing it to the air for up to 5 minutes immediately after casting. However, such solvent evaporation is not used when a more isotropic and larger-pored membrane is desired and the cast film may be immersed directly into a precipation bath of pure methanol at temperatures between −30° C. and +25° C. for 10 minutes to obtain a CTA membrane.

The CTA membrane may then be converted into the much more solvent-resistant hydrolysis product of regenerated cellulose by conventional hydrolysis techniques typically comprising soaking the CTA membrane in an ambient-temperature water bath for 15 to 20 minutes to leach out excess solvent, then immersing the CTA membrane in a hydrolysis bath comprising an aqueous solution of about 10 wt% alkali metal hydroxide such as potassium hydroxide and 30 wt% DMSO. The hydrolysis reaction is essentially complete within about 20 minutes.

EXAMPLES

CTA membranes according to the present invention were prepared by dissolving the wt% of CTA indicated in Table I in a solvent mixture comprising cyclohexanone and MEC in the indicated weight ratio (cyclohexanone being the first-appearing number in the ratio), casting films of the casting solution in the thicknesses indicated with a spreader knife and precipitating the membranes by immersion in a pure methanol bath at the indicated temperature. Regenerated cellulose membranes of each CTA membrane except Example 6 were then prepared by hydrolyzing the CTA membranes by soaking the same in an ambient-temperature water bath for 20 minutes, followed by immersion for 20 minutes in an aqueous solution of 10 wt% KOH and 30 wt% DMSO. The membranes were then washed with water and stored for about 60 minutes in distilled water until used. The thicknesses and pore sizes reported in Table I are for the final regenerated cellulose and CTA membranes prepared.

TABLE I

| Ex. No. | wt % CTA | Solvent Ratio | Temperature MeOH Bath | Thickness (mmµ) | Pore Size (mmµ) |
|---|---|---|---|---|---|
| 1 | 2.5 | 3:1 | −10° C. | 38 | 0.1 |
| 2 | 2.5 | 2:1 | +15° C. | 41 | 0.05 |
| 3 | 2.5 | 1:1 | +25° C. | 50 | 0.03** |
| 4 | 6.1 | 1:1.4 | +15° C. | 18 | " |
| 5 | 6.7 | 1:1.8 | +15° C. | 10 | " |
| 6* | 2.5 | 2:1 | +10° C. | 60 | " |

*30-second evaporation of solvent after casting
**Not measurable below 0.03 micron Oxygen facilitated-transport liquid membranes were prepared by immersing the regenerated cellulose porous support membranes of Examples 1-5 in a solution containing an oxygen complexing agent (oxygen carrier). The pores of the support membranes were filled with the solution by capillary action. The resulting supported-liquid membranes were then placed between the two compartments of a filtration cell and atmospheric air was swept across one surface of the membrane while a reduced pressure was maintained on the opposite side of the membrane. Oxygen was selectively transported across the composite liquid membrane by facilitated transport. In the examples shown in Table II, oxygen in atmospheric air (14 cmHg partial pressure) combined with the carrier at the feed side of the liquid membrane to form an oxygen-carrier complex. This complex diffused to the opposite side of the liquid membrane where the complex released the oxygen to the low-pressure product stream (2 cmHg partial pressure). The carrier then diffused back to the feed side of the membrane and completed the cycle. Nitrogen and the other minor components in air were not assisted in their transport across the liquid membrane, thereby greatly increasing the flux of oxygen across the liquid membrane over the flux of the other gases present in air.

The test results of various oxygen facilitated-transport membranes using the commercial support membranes Ultipor NM ® and Celgard 2500 ® and regenerated cellulose support membranes prepared by the present invention are given in Table II. Ultipor NM ® is a membrane of Nylon 66 ® made by Pall Trinity Micro Corporation of Cortland, N.Y., while Celgard 2500 ® is a membrane of polypropylene made by Celanese Fibers Marketing Corporation of Charlotte, N.C. Membrane flux has been normalized to membrane thickness and driving force (pressure) in the reported membrane permeabilities. Liquid membranes using the regenerated cellulose membranes of the present invention as supports show comparable and even superior performance to those using commercially available support membranes.

TABLE II

| Support Membrane | Thickness (µm) | Oxygen* Permeability | Nitrogen* Permeability | Oxygen Content of Product Gas (mole %) |
|---|---|---|---|---|
| Ultipor NM ® (0.2 µm pore rating) | 125 | 26 | 1.0 | 85 |
| Celgard 2500 ® (0.04 µm pore rating) | 25 | 10 | 0.46 | 83 |
| Ex. 1 (0.1 µm pore rating) | 38 | 40 | 1.5 | 86 |
| Ex. 2 (0.05 µm pore rating) | 41 | 28 | 1.1 | 84 |
| Ex. 3 (>0.03 µm pore rating) | 50 | 21 | 1.1 | 82 |
| Ex. 4 (>0.03 µm pore rating) | 18 | 4.4 | 0.50 | 68 |
| Ex. 5 (>0.03 µm pore rating) | 10 | 1.0 | 0.17 | 60 |

*Measured in units of $\frac{cm^3 \text{ (STP) cm}}{cm^2\text{-sec-cm Hg}} \times 10^{-9}$ To ascertain their potential usefulness as dialysis membranes, both regenerated cellulose membranes and CTA membranes prepared in accordance with the present invention were tested as substitutes for the commercial dialysis membranes used in clinical blood analysis equipment. The dialysis membranes in such equipment perform the function of rejecting high molecular weight components in blood test samples which would interfere with the analysis procedure, and pass the low molecular weight components that are the subject of the analysis. The analysis for serum levels of alkaline phosphatase involves the membrane permeation and detection of the low-molecular-weight solute p-nitrophenol (MW 139). Table III gives the permeability at 25° C. of CTA and regenerated cellulose membranes prepared in accordance with the present invention, and the permeability of two commercially available regenerated cellulose dialysis membranes, Cuprophan ® 150 and Cuprophan ® 280HD, both made by Enka Glanzstoff AG of Wuppertal, West Germany. The acceptable range of p-nitrophenol permeability for the purpose of automated analysis is from approximately 0.02 to 0.06 cm/min, with a desired target of 0.045 cm/min. The results, shown in Table III, demonstrate that the permeability of membranes prepared according to the present invention compare very favorably with known regenerated cellulose dialysis membranes.

TABLE III

| Membrane | p-nitrophenol Permeability (cm/min) |
| --- | --- |
| Cuprophan ® 150 | 0.021 |
| Cuprophan ® 280 HD | 0.027 |
| Ex. 5 (reg. cellulose) | 0.058 |
| Ex. 6 (CTA) | 0.034 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for the preparation of porous cellulose triacetate membranes comprising:
   (a) preparing a casting solution by dissolving from 1.25 wt% to 20 wt% cellulose triacetate in a solvent mixture comprising cyclohexanone and methylene chloride in a weight ratio of from 4:1 to 1:4;
   (b) casting a film from said casting solution;
   (c) immersing said cast film in a methanol bath at −30° C. to +25° C. to precipitate a membrane; and
   (d) recovering said membrane.

2. The method of claim 1 wherein solvent is partially evaporated from one surface of said cast film prior to immersing the same.

3. The method of claim 1, including the additional step of hydrolysis of said recovered membrane to obtain a regenerated cellulose membrane.

4. The method of claim 3 wherein said hydrolysis step comprises immersion in a water bath followed by immersion in an aqueous solution of alkali metal hydroxide and a polar solvent selected from the group consisting essentially of dimethylsulfoxide, gamma-butyrolactone and 1-methyl-2-pyrrolidone.

5. The method of claim 1 wherein the casting solution contains 2.5 wt% cellulose triacetate in a solvent comprising cyclohexanone and methylene chloride in a ratio of from 3:1 to 1:1.

6. The method of claim 1 wherein the casting solution contains from 5 wt% to 10 wt% cellulose triacetate in a solvent mixture comprising cyclohexanone and methylene chloride in a weight ratio of from 1:1 to 1:2.5.

* * * * *